United States Patent [19]

Young

[11] Patent Number: 4,471,972

[45] Date of Patent: Sep. 18, 1984

[54] PROPULSION AND SAFETY DEVICE FOR A CONVENTIONAL WHEELCHAIR

[76] Inventor: Raymond L. Young, 5729 Shadow Creek Dr., Sacramento, Calif. 95841

[21] Appl. No.: 370,277

[22] Filed: Apr. 20, 1982

[51] Int. Cl.³ ........................ B62B 11/00; B62M 1/14

[52] U.S. Cl. .............................. 280/289 WC; 280/42; 280/242 WC; 280/244; 280/250; 280/287; 280/639; 296/65 R; 297/DIG. 4; 410/23

[58] Field of Search .................. 280/242 WC, 30, 42, 280/234, 242 R, 244, 247, 249, 250, 289 WC; 297/45, DIG. 4; 180/6 J, DIG. 3, 907; 410/4, 23; 296/65 R

[56] References Cited

U.S. PATENT DOCUMENTS

| | | | |
|---|---|---|---|
| 3,485,510 | 12/1969 | Merlan | 280/250 |
| 4,152,005 | 5/1979 | Vanore | 280/234 |
| 4,316,616 | 2/1982 | Boivin | 280/289 WC |

*Primary Examiner*—David M. Mitchell
*Assistant Examiner*—Mitchell J. Hill
*Attorney, Agent, or Firm*—Bernhard Kreten

[57] ABSTRACT

A propulsion and steering device for a conventional wheelchair or the like which includes a frame and attachment instrumentalities extending from the frame to the wheelchair, propulsion and steering instrumentalities which form a part of the frame and include a steerable wheel, and a folding instrumentality integrally formed with the frame to collapse the frame for storage, in which the folding mechanism is relatively adjustable which changes the steering rake angle to accommodate people of different dimensions, and the propelling area is rotatably adjustable to similarly accommodate people of different dimensions.

17 Claims, 9 Drawing Figures

PROPULSION AND SAFETY DEVICE FOR A CONVENTIONAL WHEELCHAIR

BACKGROUND OF THE INVENTION

This invention relates generally to propulsion and steering devices for conventional wheelchairs. More specifically, the instant invention is directed to a device which lends itself to facile and ready attachment to a plurality of different types of wheelchairs irrespective of their construction, the attaching area therefore being generic to different types of wheelchairs. Additionally, a steering and propulsion device is provided which reliably allows the person constrained within the wheelchair to propel and steer in a predictable and safe manner providing the occupant of the wheelchair with a reliable and safe means for encountering various types of terrain. A further feature of the instant invention relates to an ability to adjust the frame in a plurality of dimensions so as to accommodate people of different configurations, and also to provide a means for folding the frame so as to effect compact storage.

With the increasing awareness of the rights of minorities in general, buildings, jobs, and the like have been made accessible to handicapped people. In this regard, those devices which afford a higher degree of self reliance have been particularly well received in the handicapped community, for the obvious attendant benefits. To this end, there has existed a long felt yet heretofore unsatisfied need to provide handicapped people with a means for reliably traversing somewhat moderate distances. For relatively short distances, the conventional configuration of the wheelchair has been found adequate; for extremely long trips, self contained vehicles such as automobiles have been modified in such a manner to allow the handicapped access thereto. It is for the intermediate distances as well as the short range distances that the instant application is directed. When encountering relatively steep terrain, prior art wheelchair devices do not lend themselves readily to facile manipulation, and the steering mechanisms of conventional wheelchairs eludes many an occupant's attempt at nimble manipulation, particulary at higher speeds. Additionally, traveling in a conventional wheelchair where the propulsion means is in intimate contact with the major support wheel allows contamination of the person's hands during inclement weather, an undesirable phenomena.

The following citations reflect the state of the art of which applicant is aware insofar as these citations appear to be germane to the patent process:

U.S. Pat. No. 3,309,110, Bulmer;
U.S. Pat. No. 3,381,973, Carr;
U.S. Pat. No. 3,666,292, Bartos;
U.S. Pat. No. 3,848,891, Vittori;
Publication-Across Campus Across Town-Orthopedic Systems Inc. 1980 Publication-Profiles-June 1980.

The two publications provide known prior art devices in which a front steerable wheel is provided, attached to the wheelchair in such a manner as to elevate the forwardmost castor wheels on a conventional wheelchair. Each device may be characterized in that it borrows extensively from conventional bicycle structure, and is neither foldable for easy storage nor adjustable to accommodate a plurality of different types of wheelchairs. More specifically, the device called "Unicycle" attaches only to a standard "Everest-Jennings" chair with no modifications. There are no adjustment means to alter the steering and propelling area relative to the user of the device, and a single chain extends from the steering head down to the driving hub which includes a derailer, it being noted that it is a rare engineering feat to have the driving wheel and the steering wheel coincident in conventional bicycles. Therefore, the "Unicycle" exhibits unwanted chain torsion which leads to throwing the chain. Similarly, the citation in "Mother Earth News" provides a wheelchair in which the propelling and steering member is not relatively adjustable in its relationship to the occupant, and a pair of mounting wings are located on opposed lateral extremities of the occupant proximate to the calf area, making ingress and egress into the device extremely difficult, particularly for people whose handicap includes immobility of the lower extremities. Clearly, this device is not readily adjustable to a plurality of different sized wheelchairs as is the instant invention. Other problems in this citation include the long moment arm that extends from the hand pedals to the steering fork which requires an exaggerated turning motion by the occupant, increasing the likelihood that at least one of the occupant's hands must disengage the device to complete a turn, an unwanted phenomena, coupled with the tendency in both of these citations to expose the occupant to the chain and sprocket area, a needless danger.

Although various other known prior art devices have attempted to address one or more shortcomings noted hereinabove, they too exhibit design problems of their own. For example, while the Carr patent appears to supply a greater degree of safety in excluding the occupant from the chain drive, this device would clearly not lend itself to nimble, agile motion at a higher rate of speed as does the instant application, and this citation appears to provide a complete living area for an invalid, thereby dictating the associated structure. Therefore, any similarities between the instant invention and this citation appears to be merely coincidental.

The patent to Vittori teaches the use of another known front wheel drive device for use by paraplegics, which while recognizing some of the pleasures and advantages capable of being derived by a front wheel drive mechanism, does not lend itself to be adapted to affixion to a conventional known prior art wheelchair, but rather requires a completely new vehicle. Therefore, the only similarity between this citation and the instant invention would be the coincidental structure similarity of the drive propulsion mechanism, the steering mechanism being functionally dissimilar.

The remaining two prior art devices, the patents to Bulmer and Bartos each teach the use of occupant propelled wheelchairs, in which the enlarged rear wheel of a conventional wheelchair is the drive mechanism, causing hand manipulation of appropriate length levers to provide rotation of the large wheel. It should be apparent that the steering mechanism associated therewith is somewhat unnatural when compared to the steering mechanism according to the instant invention, since the relative manipulation of the lever associated with the rear drive wheel also provides the direction altering capabilities. Thus, it can be seen that steering, particularly at a relatively high rate of speed could not be achieved as readily as with conventional steering mechanisms.

The instant invention is distinguished over the prior art citations in that a propulsion and steering device has been provided adapted to engage any of a plurality of conventional wheelchairs and includes a frame, attaching means for affixing the frame to the conventional prior art known wheelchair, steering and propelling means forming a part of the frame which includes a single steerable wheel, a folding means formed on the frame to collapse the frame for convenient storage and transport, and a plurality of adjustment means on the frame to allow different components of the propulsion and steering device to be relatively adjusted so that people of diverse dimensions can all be accommodated by one device particularly as set forth in the instant application.

SUMMARY AND OBJECTS OF THE INVENTION

Accordingly, it is an object of this invention to provide a device which defines a new and novel propulsion and steering mechanism adapted to be attached to any of a plurality of conventional wheelchairs known in the prior art.

It is yet a further object of this invention to provide a device of the character described above which is extremely durable in construction and simple to install so that an invalid or other similar person likely to be an occupant of the wheelchair can attach same thereto without the need for cumbersome tools or additional assistance.

It is yet a further object of this invention to provide a device of the character described above which when not in use can be conveniently folded for storage.

It is still yet a further object of this invention to provide a device of the character described above in which the steering, propulsion means, and means for attachment to the wheelchair are provided with various adjustments so as to accommodate people of different dimensions.

It is still yet a further object of this invention to provide a device of the character described above which allows greater speeds to be obtained by the occupant of the wheelchair thereby increasing the range of wheelchairs without compromising the safety or ability to maneuver the wheelchair at higher speeds.

It is still yet a further object of this invention to provide a device of the character described above which is formed from a plurality of standard components but in a unique configuration so as to reduce the cost of assemblage making the device accessible to people in even the lowermost economic strata.

These and other objects will be manifest when considering the following detailed patent specification when taken in conjunction with the appended drawing figures in which there has been provided an instrumentality for attaching a steering and propulsion device according to the instant invention to a conventional wheelchair or the like, the attaching instrumentality suitably fashioned to accommodate several known prior art wheelchairs, steering and propulsion instrumentalities for allowing the frame thus attached to the wheelchair to propel an occupant within the wheelchair at a relatively elevated speed without compromising the safety or maneuverability of the device and without requiring any additional concomitant elevation in the skill level of the occupant, an instrumentality for folding the frame so as to provide a compact storage arrangement, and a plurality of adjustment instrumentalities to alter and orient various components of the device relative to the occupant so as to accommodate people of various dimensions.

BRIEF DESCRIPTION OF THE DRAWING FIGURES

Figure 7:
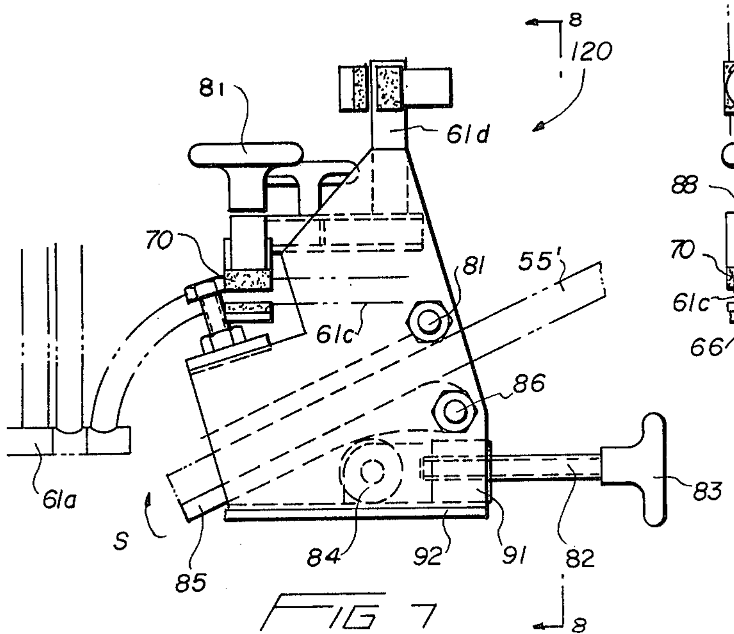

FIG. 7 teaches the use of a side view of an alternative attachment mechanism for the frame to the wheelchair.

Figure 8:
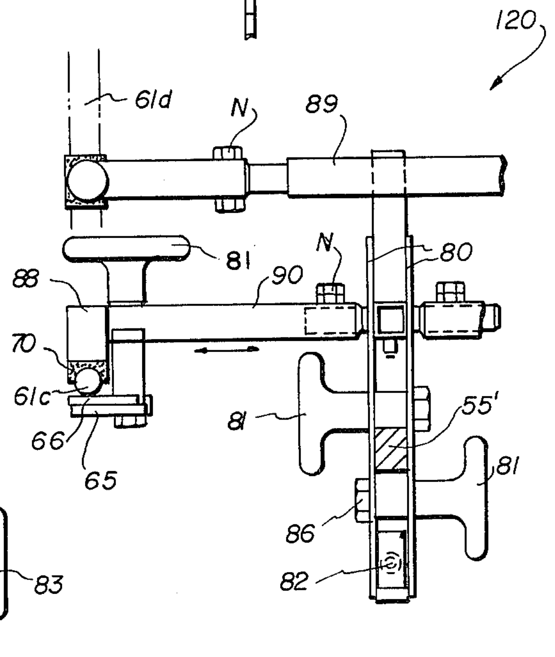

FIG. 8 is a section line taken along lines 8—8 of FIG. 7.

Figure 1:
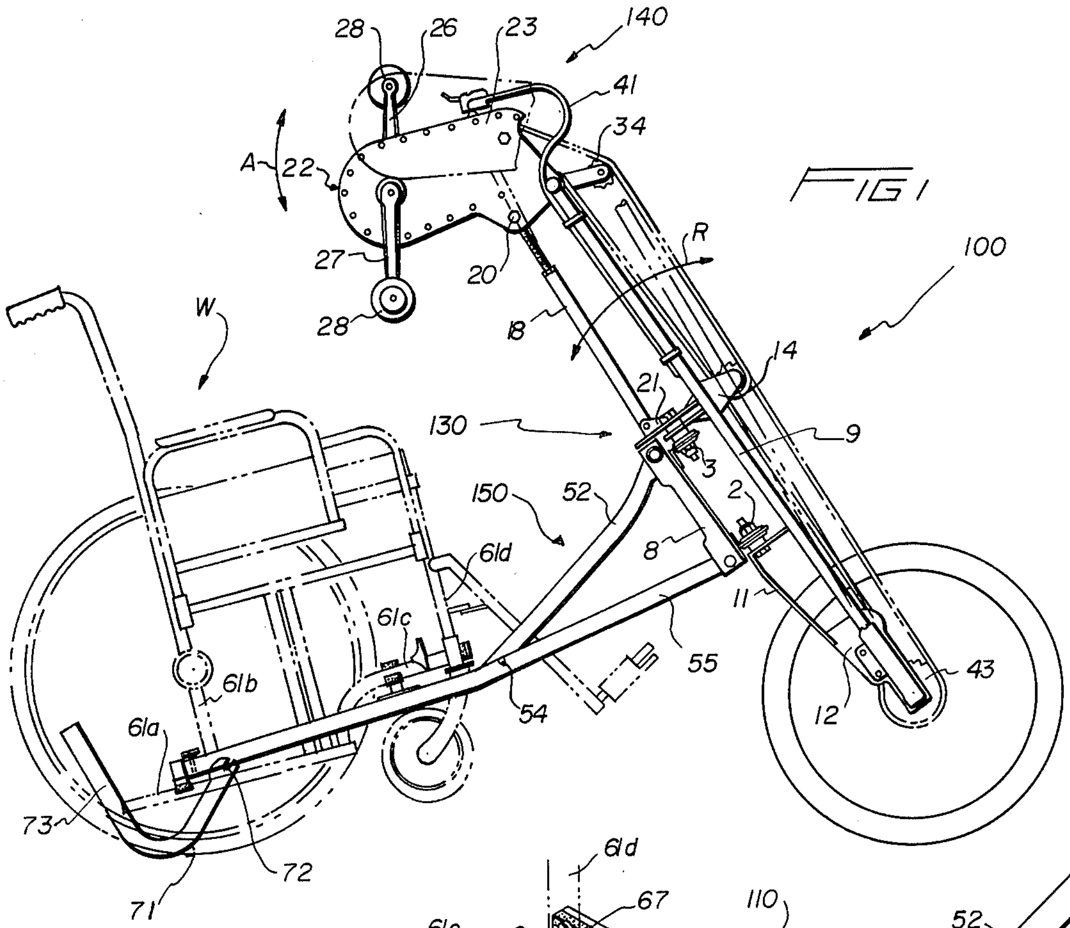
FIG. 1 is a side view of the apparatus according to the present invention with a wheelchair of a known type attached thereto.
Figure 3:
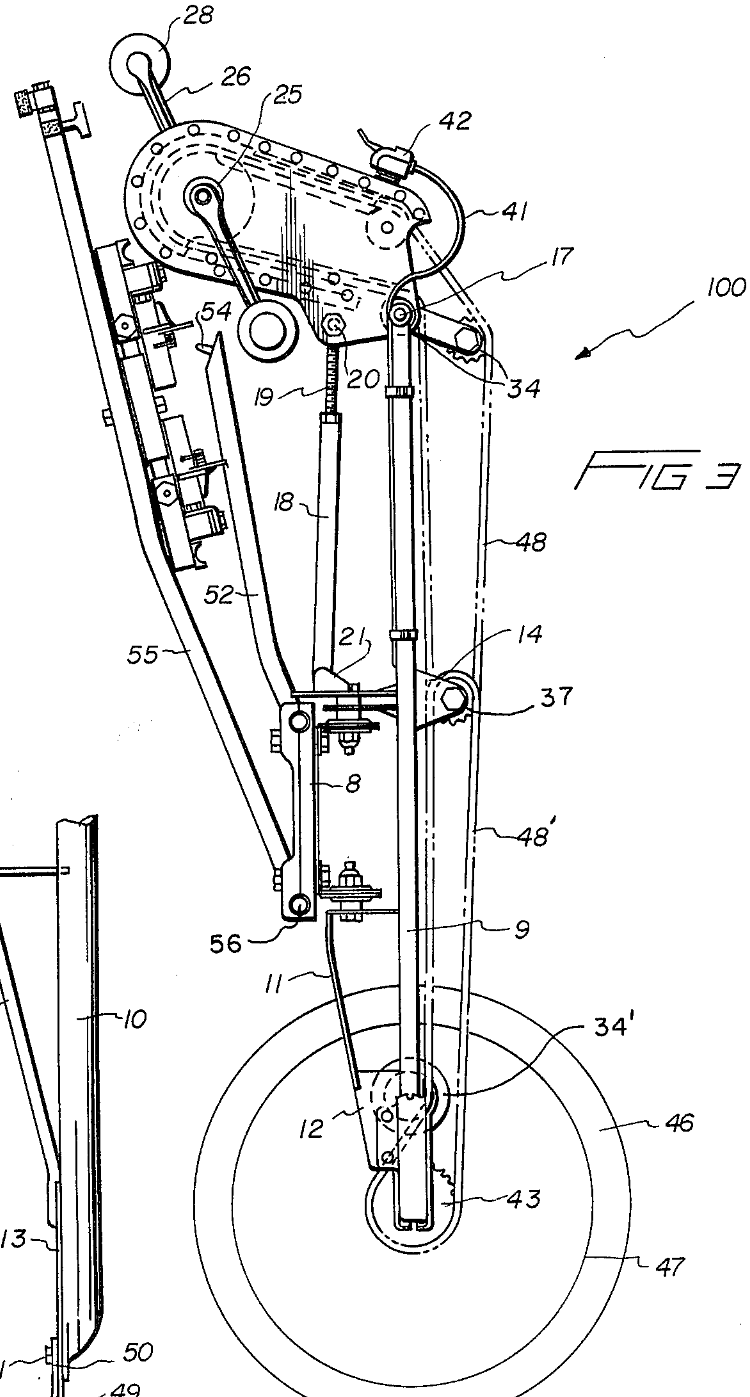
FIG. 3 is a side view of the device shown in FIG. 1 with the wheelchair removed and the device in a folded, storage position.
Figure 9:
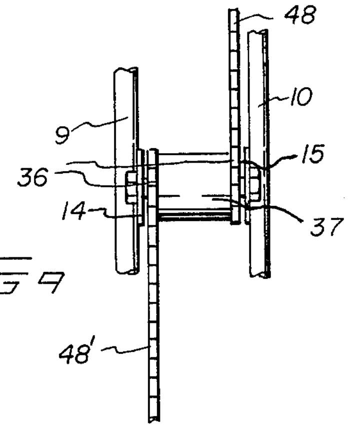

FIG. 9 is a front view showing a medial portion of the front fork steering and chain drive mechanism according to the instant application as seen in FIGS. 1 and 3.

DESCRIPTION OF THE PREFERRED EMBODIMENT

Referring to the drawings now, wherein like reference numerals refer to like parts throughout the various drawing figures, reference numeral 100 is directed to the propulsion and steering device for a conventional wheelchair according to the present invention.

Generally speaking, the device 100 includes a frame 150, a means for attaching the frame to the wheelchair W, the attachment means bearing the reference numerals 110 (FIG. 2) or 120 (FIGS. 7 and 8). In addition, a steering means 130 is provided which in conjunction with the propelling means 140 provides accurate and facile manipulation of the device in its intended environment.

Figure 5:
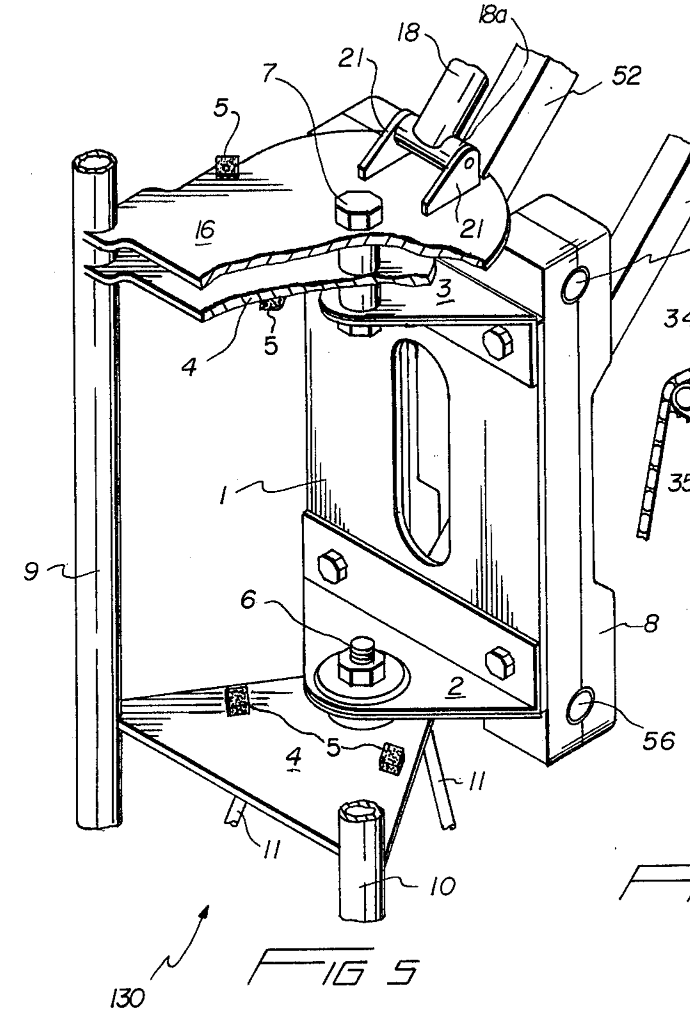
FIG. 5 is a perspective view from a direction opposite that which is shown in FIGS. 1 and 3 of the steering fork head, illustrating the novel structure thereof.

More specifically, the steering assembly 130 is best shown in FIG. 5 and includes a steering frame plate 1 preferably formed from aluminum or the like having lower and upper extremities thereof and lower and upper ball bearing pillow blocks 2, 3 respectively. More particularly, the upper and lower pillow blocks 3, 2 respectively are attached to the aluminum steering frame plate 1 by means of a vertical flange bolted on one face, and each pillow block is relatively spaced apart so that the lower and upper pillow blocks have a substantially triangular configuration in different horizontal planes. Apertures are provided in each of the pillow blocks and are adapted to receive lower and upper steering rotation bolts 6, 7 respectively, each steering bolt allowing free rotation thereof without concomitant loosening of the bolts from the pillow blocks. To this end, the pillow blocks include bushing members as best seen in FIG. 5. The rotation bolts also constrain upper and lower steering plates 4 each disposed outside of the pillow blocks 3, 2. The steering plates 4 serve the dual purpose of supporting front forks 9, 10 at upper and lower extremities thereof so that the front forks 9, 10 rotate about the two steering bolts 6, 7. In addition however, the steering plate 4 is provided with plural rubber cushions 5 which abut against the vertical face of the steering frame 1 within certain limits of rotation. Thus, oversteering protection has been provided which constrains the forks relative to the above-described steering head so that the range of motion of steering is limited. Disposed above the upper steering plate 4 and separated by a spacer and supported on the steering bolt 7 is a further plate defined as a top superior fork support plate 16 which includes a notch that accepts an upper frame member 52 to secure all movement during transport, and like plate 4 plate 16 rotatably connects the forks 9, 10 to the steering bolt 7. In addition, a top face of the fork support plate 16 has the plural rubber cushions 5 disposed thereon. A top face of the fork support plate 16 also has disposed thereon a steel tubing 18 with a nut and the tube as one part at a top extremity (FIG. 3). The nut's female thread accepts a male threaded rod 19 and tube 18 is pivoted to the plate 16 by means of a pivot bolt 18*a* which includes upstanding ears 21 disposed upon the fork support plate 16 as shown in the drawings. Thus, the upwardly extending steel tubing 18 which with thread rod 19 extends from the fork support plate 16 to a drive box 22 serves as a means for drivably rotating the forks 9 and 10. To this end, the pivot bolt 18*a* extends between the ears 21 for the purpose thus defined.

As mentioned, the tubing 18 with the nut and tubing as one part at a topmost extremity extends between the fork support plate 16 and to the aluminum drive box 22 via threaded rod 19 having one end held secure by bolt 20 from turning out of adjustment, another end which allows telescoping adjustment within the nut and tube 18 as shown in FIG. 3. By removing bolt 20, then turning threaded portion 19 clockwise for down and counterclockwise for up the elevation and angulation of the gear box 22 can be altered. A terminus of the threaded rod 19 remote from the female threaded tube 18 is fixed to the drive box 22 by a bolt 20 as shown in FIG. 3. Thus, a first adjustment means has been provided for altering the drive box 22 so as to accommodate people of different dimensions.

A face of the steering frame 1 is provided with a frame hinge section 8 which allows pivotal motion of frame members 52 and 55 to be defined hereinafter.

Figure 4:
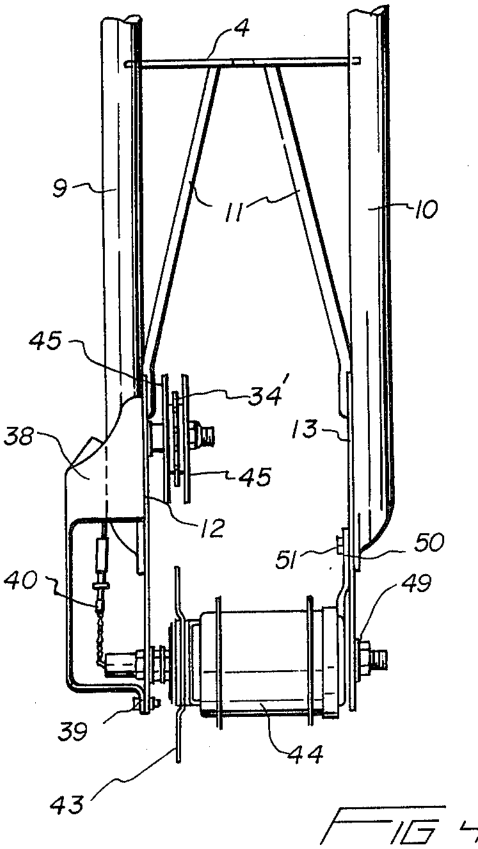
FIG. 4 is a front view of the lower portion of that which is shown in FIG. 3 with the wheel removed.

Also shown in part in FIG. 5, and FIGS. 1, 3 and 4 as well, the lower steering plate 4 has angular fork support tension bars 11 extending from an apex proximate the steering bolt 6 to the left and right forks proximate to a hub. These bars 11 angle from a centerline of plate 4 down each side thereof and tend to resist the forces imposed upon wheel 46 and rim 47 to ward fold up and under. As shown in FIG. 4, these fork support tension bars 11 angle upwardly and inwardly to the lower steering plate 4 and terminate downwardly laterally outwardly on left and right bottom fork wheel support plates 12, 13, respectively. These fork wheel support plates are disposed on inner faces of the left and right front forks 9, 10 as shown in the drawings.

Proximate to the upper steering plate 4 on an opposed face relative to the forks 9 and 10, there is provided left and right idler sprocket support plates 14, 15 respectively for purposes to be assigned later.

The mechanism by which the gear drive box 22 cooperates with the front wheel 46 can now be defined. As shown in FIG. 3, a topmost portion of the fork tubes 9, 10 terminate and are interconnected by means of a pivot bolt 17 upon which is housed a first idler chain sprocket 34 (FIG. 1) for purposes to be assigned shortly. In use and operation, loosening the pivot bolt 17 and extending or contracting the threaded portion 19 of the tube 18 will cause pivotal movement of the gear drive box 22 in the direction of the arrow A as shown in FIG. 1. In use and operation therefore, the gear drive box 22 can be rotated about the point 17 into a plurality of positions thereby altering its distance from the wheelchair W.

Figure 6:
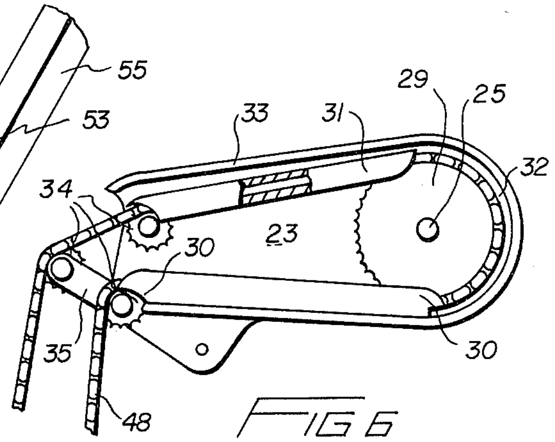
FIG. 6 shows a top portion of the propulsion mechanism in FIGS. 1 and 3 with a cover plate removed for greater clarity.

More specifically the drive box 22 includes left and right cover plates 23 at one end of which remote from the front fork tubes 9, 10 is disposed left and right crank arms 26, 27 suitably supported in a bearing 25. Extremities of the pedal cranks 26, 27 are provided with handgrips 28 which in a preferred form include internal ball bearings and a rubber outer cover so that ease of rotation is provided. Each of the pedal crank arms 26, 27 are oriented relative to each other 180° out of phase in a somewhat conventional manner, and each communicates operatively with a central drive gear 29 which communicates through a chain system with three upper sprockets 34 disposed in triangular relationship as shown in FIG. 6. The lowermost of the three sprockets 34 receives a chain 48 thereover which is constrained to move within a lower chain guide block 30 having a chain entrance, the chain 48 thusly threaded being forced to ride within a channel formed within the chain guide block 30 to contact against the central drive gear 29. Upon appropriate manipulation of the crank arms 26, 27, and further constrained by a curved chain drive spacer block 32, the chain 48 is picked up by the drive gear 29 and forced into an upper chain guide block 31 which includes an exit at the uppermost or highest idler chain sprocket 34. As shown, the upper chain guide block 31 includes a central passageway which once the chain has been disposed therein constrains the chain to exit from the chain guide block to the uppermost idler sprocket 34. Thence, the chain exits the topmost portion of the sprocket and contacts the last of the triangularly arranged idler sprockets 34, this last mentioned idler sprocket being the only one not supported directly by the drive box 22. Rather, this last idler is separated from the drive box 22 by means of an upper chain idler adjustment 35 which is a rod capable of longitudinal extension. The drive box 22 includes left and right covers 23, a spacer 33 disposed on an outer periphery providing a clearance adequate for the chain width to be accommodated within the housing, so that when assembled, none of the chain and sprocket assemblies are exposed proximate to the cranks 26, 27, a desirable feature.

The uppermost chain 48 terminates on an idler bearing 37 FIG. 9 supported between the left and right idler sprocket support plates 14, 15 emanating on one face of the fork tubes 9 and 10 opposite the upper steering plate 4, as described supra. While an idler bearing has been shown and, first and second sprockets 36 are provided, it should be apparent that the idler bearings so constructed allows free-wheeling should one so desire, but this idler bearing can also serve as an area for gaining mechanical advanatage as by changing the number of sprocket teeth on the two sprockets 36 disposed thereon. In any event, the idler bearing 37 operatively drives through a second sprocket 36 a lower chain 48' as shown in FIG. 9.

Following the lower chain 48' to the front tire 46, it is clear that the lower chain 48' terminates on a drive wheel sprocket 43 inwardly formed with a coaster brake 44 serving as the hub of the front wheel, the hub suitably supported between the forks 9 and 10 by means of a drive shaft slot safety clip 49 disposed on opposed extemities and adapted to coact with an axle on the coaster brake. The drive wheel sprocket 43 reliably communicates with the chain 48' through an intermediate lowermost idler sprocket 34' mounted on the left fork 9 and when so configured, the chain 48' is constrained from jumping and being disengaged by means of aluminum chain guide discs 45 disposed on opposed sides of the lowermost idler sprocket 34. As shown in FIG. 4, a brake lever 50 is bolted to the right fork 10 so that by reversing the rotation of the cranks 26, 27, the brake will be conventionally applied on the coaster brake 44. The coaster brake 44 is similarly provided with means to change gears defined by a gear shift chain 40 adapted to communicate within a central portion of the coaster brake, the shifter chain extending upwardly and protected from the environment by means of a speed shift chain guard 38 disposed upon the left fork 9 and fastened thereto by means of bolts 39. As shown in FIG. 3, the gear shift chain 40 extends upwardly to the drive box 22 where a gear shift cable cover 41 allows operative communication of the coaster brake with a gear shift speed selector 42. Thus, a means for gaining mechanical advantage has been provided through a gear shifting mechanism according to the apparatus of the present invention.

As mentioned earlier, the frame hinge section 8 FIG. 5 serves to support an upper pivot 53 intimately connected to the upper frame member 52 and a lower pivot 56 operatively connected to the bottom frame support 55. Thus, both frame members relative to the fork head 130 are capable of articulation thereabout so that the stored position, as shown in FIG. 3, can be achieved by rotating the frame members 52 and 55 upwardly.

Figure 2:
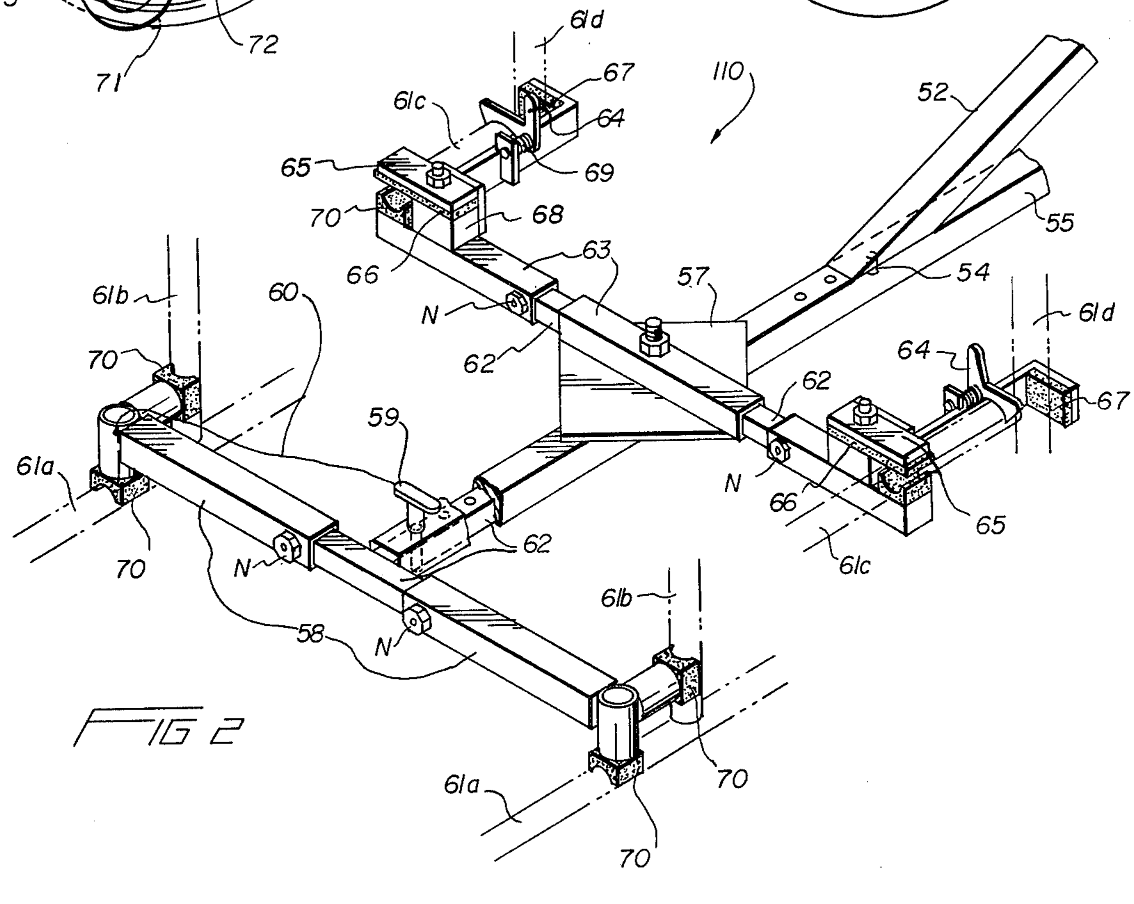
FIG. 2 is a perspective view of one form of wheelchair supporting frame mechanism according to the instant invention.

An extremity of the frame upper portion 52 is provided with a pin 54 adapted to be received within one of a plurality of apertures on a top face of the lower frame member 55 as best shown in FIG. 2. Thus, when rotated into a deployed postion, the upper frame member 52 is rigidly affixed to the lower frame member by means of the pin registering in an aperture and a triangular brace member has been provided for substantial rigidity. The plurality of apertures changes the rake angle in the direction of the arrow R of the fork head 130, thereby providing another means for altering the configuration of the device relative to different the geometrical configuration of an individual user.

The rear portion of lower frame member 55 incorporates a means for attachment to the wheelchair W proper and also a mechanism for deploying the wheelchain W thereon; such will now be defined.

More specifically, a terminal portion of the lower frame 55 is adapted to telescopically engage a trailing transverse member 58 at a rearmost extremity. The telescopic engagement is made by slidable disposition of an end 62 colinear with the lower frame member 55 within a hollow thereof and attached by means of a lock pin 59 within apertures of registry so that wheelchairs having different relative wheel bases can be accommodated. A tether 60 can be provided attaching the lock pin 59 to a suitable portion of the carriage frame as is desired to prevent its loss when not in use. Forward of the rearwardmost transverse portion, a plate 57 defines an intersection with a second transverse member 63, the second transverse member adapted to carry therewithin the forwardmost wheels or castor type wheels of a conventional wheelchair. Similarly, each transverse member 63, 58 is capable of lateral extension by telescoping engagement with members 62 as shown in the drawings. Thus, wheelchairs of different track widths can be accommodated by the lateral extension or contraction of these transverse members. Once the appropriate dimensions for a given conventional wheelchair have been determined, however, the dimensions can be suitably secured by means of tightening the telescoping members 63, 62 and 58, 62 through nuts N as shown in FIG. 2. Not only does the intersection plate 57 provide a means of connecting the frame lowermost portion 55 with the forward transverse member 63, but it also serves to distribute load forces over a wider area than would have been possible without same.

As shown in phantom in FIGS. 1 and 2, a conventional wheelchair that has first spaced parallel horizontally disposed trailing members 61*a* adapted to support a back portion of a chair by means of vertical members 61*b* emanating upwardly therefrom can be supported by the device according to the instant application in the following manner. As shown in FIG. 2, arcuate teflon blocks 70 communicate with lateral extremities of the rearmost or trailing transverse segment 58, and since a characteristic feature of the instant invention is that the rear wheels of the chair serve to support the occupant, a downwardly curve orientation of the teflon blocks 70 as they engage the horizontal members 61*a*, and a forward arcuate configuration of the teflon blocks 70 as they engage the vertical member 61*b* are adequate, given further constraint, to accurately secure the wheelchair thereto. Forward thereof and at the leading transverse 63, upper horizontally elevated and spaced parallel rod members 61*c* of a conventional wheelchair are adapted to engage clamp members for secure fastening. In addition, vertical tubular members 61*d* of the wheelchair W which extend upwardly from terminal portions of rod members 61*c* are adapted to coact with the attachment area in nonscraping engagement so that the finished surfaces of all mating parts are not marred. Specifically, lateral extremities of the transverse bar 63 are provided with riser blocks 68 on an outermost portion of which are provided arcuate teflon blocks 70 with the arcuate portion facing upwardly so that the horizontal sections of the tubes 6*k* of the wheelchair can nest thereon. A pivoting safety lock bolt and clamp 65 is provided extending through the riser 68, and a teflon pad 66 is interposed and abutted against the horizontal tube 61*c* with the clamp 65 so that when the clamp is rotated in an operative position as shown in FIG. 2, that horizontal tubular portion 61*c* of the wheelchair is constrained thereby. The lateral extremities of the transverse member 63 also include forwardly and horizontally extending L-shaped members having the L outwardly turned as shown in FIG. 2 to constrain further the vertical portions 61*d* of the wheelchair W as will not be defined. The base of the L-shaped section includes a teflon pad 67 on a bearing surface against the vertical rods 61*d* as shown, and the conjunction of the rods 61*c,d* from its horizontal 61*c* to its vertical 61*d* portion is constrained by means of a lock assembly 64 supported on the L-shaped portion of the transverse member 63. More specifically, the lock assembly includes a support member which is spring biased against the L-shaped member and an arcuate lock piece provided with a thumb piece allows rotation of the thumb piece against the spring pressure until the horizontal section 61*c* of the wheelchair is in position. Thereafter, releasing the lock assembly 64 causes same to be in clamping engagement as shown in FIG. 2.

In use and operation, the device according to the instant application takes the form of that which is shown in FIG. 1, the forward or leading wheels of the wheelchair W suspended in depending relationship from the frame 150 as shown. The load bearing is assumed by both major wheels of the wheelchair W and the leading steering and drive wheel 46. A device has been provided which assists in the manipulation of the wheelchair W into the position shown in FIG. 1, and takes the following form. As shown in FIG. 1, a jack 73 is provided of substantially arcuate configuration having a bifurcated terminus near the intersection of members 55 and 58. In addition, the loading jack 73 is supplemented by a transverse rod 71 emanating from a bottom portion thereof to provide lateral stability therefor. The bifurcation 72 engages the intersection of the frame member 55 and its transverse counterpart 58 to raise same, a rocking motion effected which will cause the wheelchair W to rotate backwardly slightly allowing ready manipulation of the front portion of the wheelchair for firmly securing same into the framework.

FIGS. 7 and 8 delineate a second form of the wheelchair support, distinct from that support frame 110 shown in FIG. 2. The second form 120 is typically shown in FIG. 7 which is a side view of the apparatus in accordance therewith, FIG. 8 being a sectional view taken along lines 8—8 of FIG. 7. More specifically, the second form of the wheelchair support mechanism is characterized in that only the forwardmost portions of the wheelchair where the depending castors are provided are connected to the invention, the horizontal section 61*c* and vertical section 61*d* are capable of rapid detachment so that the wheelchair can be separated from the device according to the instant application expeditiously and thereafter reassembled in a manner now to be defined.

A truncated lower frame member 55′ is provided which is adapted to be received within a slot on the second form 120 of the wheelchair engaging frame 120. When lower frame 55′ is slidably disposed therein, hand clamps 81 having threads on either side of the lower frame 55′ constrain the lower frame member 55′ by compressing two laterally opposed plates 80.

The horizontal section 61*c* of the wheelchair W is constrained to frame 55′ by means of a laterally extending transverse arm or bar 90 releasably secured to the plate 80 by means of a nut so that a telescopic engagement exists for lateral adjustment. The depending spaced block 88 communicates with an arcuate teflon sleeve 70 and as shown the horizontal tube 61*c* of the wheelchair W depends therefrom and is constrained by an underlying teflon pad and a safety lock pivot bolt and clamp adjustment 65.

A further horizontally offset arm or member 89 is similarly telescopically adjustable and like the earlier laterally adjustable arm 90 is capable of frictionally engaging the vertical rod portion 61*d* similar to that which is shown in FIG. 2.

In use and operation, the hand clamps 81 are loosened and the tongue 55′ of the lower frame member is withdrawn from plates 80 allowing the wheelchair to be used apart from the device according to the instant application. When it is time to rehitch, the tongue 55′ is slidably disposed within the slot provided between plates 80 and the two hand clamps 81 are tightened. Thereafter, a threaded shaft 82 having a handle 83 is caused to threadedly engage a block 91 fixed in a bottom portion 92 of the second frame of the invention which thereafter engages a cam 84 in such a manner that a lever bar 85 pivots around the threaded nut end 86 of one of the clamps 81 causing the lever bar to pivot the truncated tongue 55′ in the direction of the arrow S. Thus, the rake angle of the device according to the instant application relative to the wheelchair W can be altered, the net effect of this adjustment knob 83 is to further raise the depending castor wheels on the forward portion of the wheelchair in the air.

Having thus described the invention it should be apparent that numerous structural modifications are contemplated as being part of this invention as set forth hereinabove and defined hereinbelow by the claims.

What is claimed is:

1. A propulsion and steering device for a conventional wheelchair or the like, comprising in combination:

a frame, means for attaching said frame to the wheelchair, steering and propelling means forming a part of said frame including a steerable drive wheel, folding means on said frame to collapse said frame for storage, and means for fixing all steerable parts to prevent movement for transport when said frame is collapsed including adjustment means on said frame to accommodate people of different dimensions by varying the relationship of portions of said frame wherein said ajustment means on said frame include means to angulate said propelling means relative to an occupant in the wheelchair and means to angulate said steering means relative to the occupant, said frame includes upper and lower frame pieces each having an end connected to a spring frame plate, said upper frame piece of lesser length than said lower frame piece, said ends on said steering frame plate capable of pivoting from a lowermost position to an upper position, thereby defining said folding means wherein said ends of said upper and lower frame members remote from said steering frame plate are relatively interlocked including a plurality of apertures on one said frame member one of which is adapted to register with a guide pin extending from other said frame member.

2. The device of claim 1 wherein said adjustment means for angulating said propelling means includes a tubular rod having a threaded end extending between said steering means and a gear drive box, said propelling means comprising a drive gear disposed within said gear drive box having laterally and radially outwardly extending diametrically opposed crank arms, a plurality of idler gears communicating a chain from within said gear drive box without therefrom, said chain extending downwardly to an idler bearing means supported on idler sprocket support plates proximate to a top of said steering means, a further chain coacting with a sprocket disposed upon said idler bearing means extending downwardly to a drive wheel sprocket operatively connected to said drive wheel, a pair of forks extending from said drive wheel sprocket to said gear drive box supporting said steering means, and an idling sprocket disposed on one of said pair of forks between said drive wheel sprocket and said idler bearing to assure proper chain tension at all times.

3. The device of claim 2 wherein said steering means includes handgrips disposed on extremities of said pedal crank arms remote from said drive gear, said pair of forks comprising first and second parallel forks on opposed sides of said gear drive box extending to said drive wheel sprocket, said steering means defined by upper and lower plates fixed to said forks, upper and lower steering bolts extending therethrough and supporting thereon upper and lower pillow blocks which in turn fasten to said steeing frame plate having said upper and lower frame pieces disposed thereon.

4. The device of claim 3 wherein said means for attaching said frame to the wheelchair include first and second transverse members adapted to receive and retain certain horizontal and vertical rods of the wheelchair, said transverse members are provided with telescoping means to relatively adjust the lateral length thereof and rigidly affix same thereto after adjustment, a safety lock pivot bolt and clamp adjustment pivotal at lateral extremities of said transverse members adapted to frictionally overlie horizontal tubular portions of the wheelchair, and a spring biased lock assembly pivotal from an inoperative position against spring pressure to a locked position operatively connected to said transverse member for further wheelchair locking.

5. The device of claim 3 wherein said attaching means comprises a clamping means for constraining said lower frame member within a slot disposed between two plates, said clamping means acting by pressure against threads to fixedly constrain said lower frame member thereon, first and second vertically stacked laterally extending telescopically disposed arms, a lowermost of which engages a horizontal tubular portion of the wheelchair, a safety lock pivot bolt and clamp pivotally adjusted from an operative to an inoperative position adapted to engage said horizontal tubular portion thereto, and a vertical guide member on a second vertically elevated laterally extending arm member, said lower frame member provided with means for angulation defined by a threaded bolt turned by a handle, said threaded bolt adapted to engage a threaded block disposed within said attaching means, and said threaded bolt actuating a cam member, said cam member pivotally moving a lever from a lower position to an upper position thereby rotating said lower frame member and said wheelchair relative to each other.

6. The device of claim 1 wherein said propelling means includes an enclosed gear drive box having a gear train therein, and a channelway in said box for directing a chain through said box without disassembly of said box.

7. The device of claim 2 wherein said propelling means includes an enclosed gear drive box having a gear train therein, and a channelway in said box for directing a chain through said box without disassembly of said box.

8. The device of claim 1 wherein said means for attaching said frame to the wheelchair include first and second transverse members adapted to receive and retain certain horizontal and vertical rods of the wheelchair, said first and second transverse members are provided with telescoping means to relatively adjust the lateral length thereof and rigidly affix same thereto after adjustment, a safety lock pivot bolt and clamp adjustment pivotal at lateral extremities of said transverse members adapted to frictionally overlie horizontal tubular portions of the wheelchair, and a spring biased lock assembly pivotal from an inoperative position against spring pressure to a locked position operatively connected to said transverse member for further wheelchair locking.

9. The device of claim 2 wherein said means for attaching said frame to the wheelchair include first and second transverse members adapted to receive and retain certain horizontal and vertical rods of the wheelchair, said transverse members are provided with telescoping means to relatively adjust the lateral length thereof and rigidly affix same thereto after adjustment, a safety lock pivot bolt and clamp adjustment pivotal at lateral extremities of said transverse members adapted to frictionally overlie horizontal tubular portions of the wheelchair, and a spring biased lock assembly pivotal from an inoperative position against spring pressure to a locked position operatively connected to said transverse member for further wheelchair locking.

10. The device of claim 1 wherein said attaching means comprises a clamping means for constraining said lower frame member within a slot disposed between two plates, said clamping means acting by pressure against threads to fixedly constrain said lower frame member thereon, first and second upper and lower laterally extending telescopically disposed arms, said lower arm engages a horizontal tubular portion of the wheelchair, a safety lock pivot bolt and clamp pivotally adjusted from an operative to an inoperative position adapted to engage said horizontal tubular portion thereto, and a vertical guide member on a second vertically elevated laterally extending arm member, said lower frame member provided with means for angulation defined by a threaded bolt turned by a handle, said threaded bolt adapted to engage a threaded block disposed within said attaching means, and said threaded bolt actuating a cam member, said cam member pivotally moving a lever from a lower position to an upper position thereby rotating said lower frame member and said wheelchair relative to each other.

11. The device of claim 2 wherein said attaching means comprises a clamping means for constraining said lower frame member within a slot disposed between two plates, said clamping means acting by pressure against threads to fixedly constrain said lower frame member thereon, first and second upper and lower laterally extending telescopically disposed arms, said lower arm engages a horizontal tubular portion of the wheelchair, a safety lock pivot bolt and clamp pivotally adjusted from an operative to an inoperative position adapted to engage said horizontal tubular portion thereto, and a vertical guide member on a second vertically elevated laterally extending arm member, said lower frame member provided with means for angulation defined by a threaded bolt turned by a handle, said threaded bolt adapted to engage a threaded block disposed within said attaching means, and said threaded bolt actuating a cam member, said cam member pivotally moving a lever from a lower position to an upper position thereby rotating said lower frame member and said wheelchair relative to each other.

12. A propulsion and steering device for a conventional wheelchair or the like, comprising in combination:

a frame, means for attaching said frame to the wheelchair, steering and propelling means forming a part of said frame including a steerable drive wheel, folding means on said frame to collapse said frame for storage, and means for fixing all steerable parts to prevent movement for transport when said frame is collapsed, said frame includes an upper and lower frame piece, each said frame piece having an end connected to a steering frame plate, said upper frame piece being of lesser length than said lower frame piece, each said end on said steering frame plate capable of pivoting from a lowermost position to an upper position, thereby defining said folding means, wherein, each end of said upper and lower frame piece remote from said steering frame plate are relatively interlocked including a plurality of apertures on one said frame piece one of which is adapted to register with a guide pin extending from the other said frame piece.

13. The device of claim 12 including adjustment means on said frame to accommodate people of different dimensions by varying the relationship of portions of said frame.

14. The device of claim 13 wherein said adjustment means on said frame include means to angulate said propelling means relative to an occupant in the wheelchair.

15. The device of claim 12 wherein said propelling means includes an enclosed gear drive box having a gear train therein, and a channelway in said box for directing a chain through said box without disassembly of said box.

16. The device of claim 13 wherein said propelling means includes an enclosed gear drive box having a gear train therein, and a channelway in said box for directing a chain through said box without disassembly of said box.

17. The device of claim 14 wherein said propelling means includes an enclosed gear drive box having a gear train therein, and a channelway in said box for directing a chain through said box without disassembly of said box.

* * * * *